United States Patent
Seyfetdinov

(10) Patent No.: US 11,943,393 B2
(45) Date of Patent: Mar. 26, 2024

(54) SYSTEM AND METHOD FOR ELECTRONIC NOTIFICATION IN INSTITUTIONAL COMMUNICATIONS

(71) Applicant: Value-Added Communications, Inc., Reston, VA (US)

(72) Inventor: Serge Seyfetdinov, Plano, TX (US)

(73) Assignee: Value-Added Communications, Inc., Reston, VA (US)

(*) Notice: Subject to any disclaimer, the term of this patent is extended or adjusted under 35 U.S.C. 154(b) by 75 days.

(21) Appl. No.: 16/987,209

(22) Filed: Aug. 6, 2020

(65) Prior Publication Data
US 2021/0021708 A1  Jan. 21, 2021

Related U.S. Application Data

(60) Continuation of application No. 15/420,458, filed on Jan. 31, 2017, now Pat. No. 10,757,265, which is a
(Continued)

(51) Int. Cl.
*H04M 3/527* (2006.01)
*H04L 51/23* (2022.01)
(Continued)

(52) U.S. Cl.
CPC ........... *H04M 3/527* (2013.01); *H04L 51/23* (2022.05); *H04L 67/02* (2013.01); *H04L 67/306* (2013.01);
(Continued)

(58) Field of Classification Search
CPC .... H04M 3/527; H04M 3/42; H04M 3/53366; H04M 3/382; H04M 2201/12;
(Continued)

(56) References Cited

U.S. PATENT DOCUMENTS 4,054,756 A   10/1977  Comella et al.
4,191,860 A   3/1980   Weber
(Continued)

FOREIGN PATENT DOCUMENTS

EP   0989720 A1   3/2000
GB   2400284 A    10/2004
(Continued)

OTHER PUBLICATIONS

Examination Report directed to related Australian Patent Application No. 2017260202, dated Mar. 16, 2021; 7 pages.
(Continued)

*Primary Examiner* — Solomon G Bezuayehu
(74) *Attorney, Agent, or Firm* — Sterne, Kessler, Goldstein & Fox P.L.L.C.

(57) ABSTRACT

Disclosed is a multi-mode communication notification system and method for improving communication between an inmate and a third party by enabling a third party to send a web-initiated contact request for a specific inmate and further allowing the inmate to check his/her contact requests or be automatically notified of contact requests. Additionally, the system electronically notifies the third party when the specific inmate has been notified of the contact request. Further, the system notifies the third party if they have missed a call from the specific inmate.

13 Claims, 3 Drawing Sheets

Related U.S. Application Data division of application No. 12/321,893, filed on Jan. 27, 2009, now Pat. No. 9,621,714.

(51) Int. Cl.
    *H04L 67/02*           (2022.01)
    *H04L 67/306*         (2022.01)
    *H04M 3/42*           (2006.01)
    *H04M 3/533*         (2006.01)
    *H04M 3/38*           (2006.01)

(52) U.S. Cl.
    CPC ......... *H04M 3/42* (2013.01); *H04M 3/53366* (2013.01); *H04M 3/382* (2013.01); *H04M 2201/12* (2013.01); *H04M 2201/39* (2013.01); *H04M 2203/351* (2013.01); *H04M 2203/6054* (2013.01); *H04M 2203/6072* (2013.01); *H04M 2203/651* (2013.01)

(58) Field of Classification Search
    CPC ....... H04M 2201/39; H04M 2203/351; H04M 2203/6054; H04M 2203/6072; H04M 2203/651; H04L 51/30; H04L 67/02; H04L 67/306
    See application file for complete search history.

(56) References Cited

U.S. PATENT DOCUMENTS

| | | | |
|---|---|---|---|
| 4,652,700 A | | 3/1987 | Matthews et al. |
| 4,766,604 A | | 8/1988 | Axberg |
| 4,916,726 A | * | 4/1990 | Morley, Jr. ............. H04M 3/53 379/218.01 |
| 4,935,956 A | | 6/1990 | Hellwarth et al. |
| 5,068,888 A | | 11/1991 | Scherk et al. |
| 5,319,702 A | | 6/1994 | Kitchin et al. |
| 5,351,287 A | | 9/1994 | Bhattacharyya et al. |
| 5,535,261 A | | 7/1996 | Brown et al. |
| 5,539,812 A | | 7/1996 | Kitchin et al. |
| 5,553,145 A | | 9/1996 | Micali |
| 5,648,916 A | | 7/1997 | Manduley |
| 5,655,013 A | | 8/1997 | Gainsboro |
| 5,705,995 A | | 1/1998 | Lafflin et al. |
| 5,740,231 A | | 4/1998 | Cohn et al. |
| 5,745,558 A | | 4/1998 | Richardson, Jr. et al. |
| 5,768,355 A | | 6/1998 | Salibrici et al. |
| 5,778,313 A | | 7/1998 | Fougnies |
| 5,805,810 A | | 9/1998 | Maxwell |
| 5,826,034 A | | 10/1998 | Albal |
| 5,838,790 A | | 11/1998 | McAuliffe et al. |
| 5,848,397 A | | 12/1998 | Marsh et al. |
| 5,854,975 A | | 12/1998 | Fougnies et al. |
| 5,872,926 A | | 2/1999 | Levac et al. |
| 5,894,558 A | | 4/1999 | Falker |
| 5,937,037 A | | 8/1999 | Kamel et al. |
| 5,956,717 A | | 9/1999 | Kraay et al. |
| 5,958,005 A | | 9/1999 | Thorne et al. |
| 5,982,506 A | | 11/1999 | Kara |
| 5,987,611 A | | 11/1999 | Freund |
| 6,002,689 A | | 12/1999 | Christie |
| 6,035,327 A | | 3/2000 | Buckley et al. |
| 6,052,454 A | | 4/2000 | Kek et al. |
| 6,061,718 A | | 5/2000 | Nelson |
| 6,064,963 A | | 5/2000 | Gainsboro |
| 6,067,514 A | | 5/2000 | Chen |
| 6,092,192 A | | 7/2000 | Kanevsky et al. |
| 6,097,791 A | | 8/2000 | Ladd et al. |
| 6,137,864 A | | 10/2000 | Yaker |
| 6,145,004 A | | 11/2000 | Walsh |
| 6,151,679 A | | 11/2000 | Friedman et al. |
| 6,161,139 A | | 12/2000 | Win et al. |
| 6,173,259 B1 | | 1/2001 | Bijl et al. |
| 6,173,284 B1 | | 1/2001 | Brown |
| 6,192,114 B1 | | 2/2001 | Council |
| 6,226,362 B1 | | 5/2001 | Gerszberg et al. |
| 6,226,363 B1 | | 5/2001 | Miller |
| 6,233,313 B1 | | 5/2001 | Farris et al. |
| 6,233,318 B1 | | 5/2001 | Picard et al. |
| 6,246,871 B1 | | 6/2001 | Ala-Laurila |
| 6,249,808 B1 | | 6/2001 | Seshadri |
| 6,285,777 B2 | | 9/2001 | Kanevsky et al. |
| 6,304,636 B1 | | 10/2001 | Goldberg et al. |
| 6,356,867 B1 | | 3/2002 | Gabai et al. |
| 6,363,414 B1 | | 3/2002 | Nicholls et al. |
| 6,366,651 B1 | | 4/2002 | Griffith et al. |
| 6,389,276 B1 | | 5/2002 | Brilla et al. |
| 6,400,272 B1 | | 6/2002 | Holtzman et al. |
| 6,411,685 B1 | | 6/2002 | O'Neal |
| 6,477,492 B1 | | 11/2002 | Connor |
| 6,490,611 B1 | | 12/2002 | Shen et al. |
| 6,493,447 B1 | | 12/2002 | Goss et al. |
| 6,526,335 B1 | | 2/2003 | Treyz et al. |
| 6,560,323 B2 | | 5/2003 | Gainsboro |
| 6,570,970 B2 | | 5/2003 | Gruchala et al. |
| 6,591,367 B1 | | 7/2003 | Kobata et al. |
| 6,603,838 B1 | | 8/2003 | Brown et al. |
| 6,606,648 B1 | | 8/2003 | Mukundan et al. |
| 6,611,583 B1 | | 8/2003 | Gainsboro |
| 6,639,977 B1 | | 10/2003 | Swope et al. |
| 6,665,378 B1 | | 12/2003 | Spielman et al. |
| 6,665,380 B1 | | 12/2003 | Cree et al. |
| 6,668,045 B1 | | 12/2003 | Mow |
| 6,681,114 B2 | | 1/2004 | Chang et al. |
| 6,684,248 B1 | | 1/2004 | Janacek et al. |
| 6,714,982 B1 | | 3/2004 | McDonough et al. |
| 6,775,359 B1 | | 8/2004 | Ron et al. |
| 6,788,771 B2 | | 9/2004 | Manto |
| 6,801,932 B1 | | 10/2004 | Picoult et al. |
| 6,819,932 B2 | | 11/2004 | Allison et al. |
| 6,850,147 B2 | | 2/2005 | Prokoski et al. |
| 6,857,024 B1 | | 2/2005 | Chen et al. |
| 6,865,260 B1 | | 3/2005 | Meadows et al. |
| 6,879,677 B2 | | 4/2005 | Trandal et al. |
| 6,950,502 B1 | | 9/2005 | Jenkins |
| 7,003,308 B1 | | 2/2006 | Fuoss et al. |
| 7,013,002 B2 | | 3/2006 | Link et al. |
| 7,039,071 B2 | | 5/2006 | Pekonen |
| 7,039,171 B2 | | 5/2006 | Gickler |
| 7,039,949 B2 | | 5/2006 | Cartmell et al. |
| 7,046,779 B2 | | 5/2006 | Hesse |
| 7,058,163 B1 | | 6/2006 | Parekh et al. |
| 7,079,636 B1 | | 7/2006 | McNitt et al. |
| 7,085,359 B2 | | 8/2006 | Crites et al. |
| 7,095,829 B2 | | 8/2006 | Claudatos et al. |
| 7,106,843 B1 | * | 9/2006 | Gainsboro .......... H04M 3/2281 455/411 |
| 7,136,462 B2 | | 11/2006 | Pelaez et al. |
| 7,158,621 B2 | | 1/2007 | Bayne |
| 7,197,560 B2 | | 3/2007 | Caslin et al. |
| 7,248,680 B1 | | 7/2007 | Gainsboro |
| 7,256,816 B2 | | 8/2007 | Profanchik et al. |
| 7,260,383 B2 | | 8/2007 | Ngan |
| 7,265,853 B1 | | 9/2007 | Kara et al. |
| 7,277,695 B2 | | 10/2007 | Petry et al. |
| 7,278,028 B1 | | 10/2007 | Hingoranee |
| 7,333,798 B2 | | 2/2008 | Hodge |
| 7,359,494 B2 | | 4/2008 | Leonard |
| 7,363,302 B2 | | 4/2008 | Lester |
| 7,496,345 B1 | | 2/2009 | Rae et al. |
| 7,505,406 B1 | | 3/2009 | Spadaro et al. |
| 7,519,076 B2 | | 4/2009 | Janssen et al. |
| 7,551,732 B2 | | 6/2009 | Anders |
| 7,561,679 B1 | | 7/2009 | Kalbag |
| 7,561,680 B1 | | 7/2009 | Falcone et al. |
| 7,565,687 B2 | | 7/2009 | Noguchi et al. |
| 7,583,974 B2 | | 9/2009 | Benco et al. |
| 7,590,693 B1 | * | 9/2009 | Chan .................... H04L 51/212 715/752 |
| 7,651,680 B2 | | 1/2010 | Breton et al. |
| 7,664,689 B1 | | 2/2010 | Rosenfield et al. |
| 7,673,058 B1 | | 3/2010 | White et al. |
| 7,681,032 B2 | | 3/2010 | Peled et al. |
| 7,742,581 B2 | | 6/2010 | Hodge et al. |

(56) References Cited

U.S. PATENT DOCUMENTS

| | | |
|---|---|---|
| 7,742,582 B2 | 6/2010 | Harper |
| 7,783,021 B2 | 8/2010 | Hodge |
| 7,804,941 B2 | 9/2010 | Keiser et al. |
| 7,881,446 B1 | 2/2011 | Apple et al. |
| 7,899,167 B1 | 3/2011 | Rae |
| 8,000,269 B1 | 8/2011 | Rae et al. |
| 8,014,800 B2 | 9/2011 | Törnkvist |
| 8,130,919 B2 | 3/2012 | Kalbag |
| 8,190,121 B2 | 5/2012 | Smith et al. |
| 8,204,177 B2 | 6/2012 | Harper |
| 8,218,736 B1 | 7/2012 | McClintock et al. |
| 8,232,862 B2 | 7/2012 | Lowe |
| 8,238,534 B2 | 8/2012 | Link et al. |
| 8,243,891 B2 | 8/2012 | Hodge et al. |
| 8,255,300 B2 | 8/2012 | Polozola et al. |
| 8,458,732 B2 | 6/2013 | Hanna et al. |
| 8,488,756 B2 | 7/2013 | Hodge et al. |
| 8,509,390 B2 | 8/2013 | Harper |
| 8,515,031 B2 | 8/2013 | Hodge et al. |
| 8,577,003 B2 | 11/2013 | Rae |
| 8,626,118 B2 | 1/2014 | Smith et al. |
| 8,725,115 B2 | 5/2014 | Liu et al. |
| 8,838,622 B2 | 9/2014 | Irving et al. |
| 9,043,813 B2 | 5/2015 | Hanna et al. |
| 9,077,680 B2 | 7/2015 | Harper |
| 9,282,188 B2 | 3/2016 | Hodge et al. |
| 9,306,883 B2 | 4/2016 | Hodge et al. |
| 9,621,714 B2 | 4/2017 | Seyfetdinov |
| 9,667,663 B2 | 5/2017 | Hodge et al. |
| 9,680,878 B2 | 6/2017 | Hodge et al. |
| 9,680,879 B2 | 6/2017 | Hodge et al. |
| 9,692,718 B2 | 6/2017 | Bennett |
| 9,757,032 B2 | 9/2017 | Gross et al. |
| 9,787,724 B2 | 10/2017 | Hodge et al. |
| 9,807,123 B2 | 10/2017 | Hodge et al. |
| 9,871,915 B2 | 1/2018 | Hodge et al. |
| 9,876,915 B2 | 1/2018 | Hodge et al. |
| 9,923,932 B2 | 3/2018 | Hodge et al. |
| 9,967,291 B1 | 5/2018 | Hodge et al. |
| 10,116,707 B2 | 10/2018 | Hodge et al. |
| 10,218,842 B2 | 2/2019 | Hodge et al. |
| 10,397,410 B2 | 8/2019 | Hodge et al. |
| 10,560,488 B2 | 2/2020 | Hodge et al. |
| 10,749,827 B2 | 8/2020 | Hodge |
| 10,757,265 B2 | 8/2020 | Seyfetdinov |
| 2001/0036821 A1 | 11/2001 | Gainsboro et al. |
| 2001/0044297 A1* | 11/2001 | Myer .................. H04W 84/022 455/412.2 |
| 2002/0007453 A1 | 1/2002 | Nemovicher |
| 2002/0054674 A1 | 5/2002 | Chang et al. |
| 2002/0071537 A1 | 6/2002 | Gainsboro |
| 2002/0111887 A1 | 8/2002 | McFarlane et al. |
| 2002/0159600 A1 | 10/2002 | Weiner |
| 2002/0183040 A1 | 12/2002 | Lundstrom et al. |
| 2003/0002639 A1 | 1/2003 | Huie |
| 2003/0009333 A1 | 1/2003 | Sharma et al. |
| 2003/0070076 A1 | 4/2003 | Michael |
| 2003/0083041 A1 | 5/2003 | Kumar et al. |
| 2003/0086546 A1 | 5/2003 | Falcone et al. |
| 2003/0099337 A1 | 5/2003 | Lord |
| 2003/0126470 A1 | 7/2003 | Crites et al. |
| 2003/0187939 A1 | 10/2003 | O'Brien |
| 2003/0198325 A1 | 10/2003 | Bayne |
| 2003/0200078 A1 | 10/2003 | Luo et al. |
| 2003/0216983 A1 | 11/2003 | Bodin |
| 2004/0029564 A1 | 2/2004 | Hodge |
| 2004/0058667 A1 | 3/2004 | Pienmaki et al. |
| 2004/0076272 A1 | 4/2004 | Zafar et al. |
| 2004/0081296 A1 | 4/2004 | Brown et al. |
| 2004/0114740 A1 | 6/2004 | Gickler |
| 2004/0120475 A1 | 6/2004 | Bauer et al. |
| 2004/0196963 A1 | 10/2004 | Appelman et al. |
| 2004/0202327 A1 | 10/2004 | Little et al. |
| 2004/0235520 A1 | 11/2004 | Cadiz et al. |
| 2004/0236838 A1 | 11/2004 | Tout |
| 2004/0252447 A1 | 12/2004 | Hesse et al. |
| 2005/0010573 A1 | 1/2005 | Garg |
| 2005/0053221 A1* | 3/2005 | Reding .................. H04M 3/53 379/211.02 |
| 2005/0055411 A1 | 3/2005 | Bouchard |
| 2005/0078612 A1 | 4/2005 | Lang |
| 2005/0080868 A1 | 4/2005 | Malik |
| 2005/0094794 A1 | 5/2005 | Creamer et al. |
| 2005/0114192 A1 | 5/2005 | Tor et al. |
| 2005/0123111 A1* | 6/2005 | Philbin ................. H04M 15/08 379/114.01 |
| 2005/0125226 A1 | 6/2005 | Magee |
| 2005/0207341 A1 | 9/2005 | Zhang |
| 2005/0265322 A1 | 12/2005 | Hester |
| 2005/0286498 A1 | 12/2005 | Rand et al. |
| 2005/0287993 A1 | 12/2005 | Gogic |
| 2006/0062355 A1 | 3/2006 | Leonard |
| 2006/0087554 A1 | 4/2006 | Boyd et al. |
| 2006/0098796 A1 | 5/2006 | Link |
| 2006/0149644 A1 | 7/2006 | Sulmar et al. |
| 2006/0168015 A1 | 7/2006 | Fowler |
| 2006/0182232 A1* | 8/2006 | Kerr .................. H04M 3/53333 379/67.1 |
| 2006/0227763 A1* | 10/2006 | Croak .................. H04M 3/4931 370/352 |
| 2006/0245552 A1 | 11/2006 | Hayashi |
| 2006/0245559 A1* | 11/2006 | Hodge .................. H04L 63/102 379/88.19 |
| 2006/0245579 A1 | 11/2006 | Bienfait et al. |
| 2006/0256940 A1* | 11/2006 | Pekarovic .............. H04M 3/533 379/88.26 |
| 2007/0041545 A1 | 2/2007 | Gainsboro |
| 2007/0044734 A1 | 3/2007 | Maloney et al. |
| 2007/0133757 A1* | 6/2007 | Girouard ............... H04M 7/006 379/67.1 |
| 2007/0155411 A1 | 7/2007 | Morrison |
| 2007/0165790 A1 | 7/2007 | Taori et al. |
| 2007/0195751 A1 | 8/2007 | Cai et al. |
| 2007/0207785 A1 | 9/2007 | Chatterjee et al. |
| 2007/0233610 A1 | 10/2007 | Gyllenskog et al. |
| 2007/0239898 A1 | 10/2007 | Friend et al. |
| 2007/0263853 A1 | 11/2007 | Pearson et al. |
| 2007/0283006 A1 | 12/2007 | Hong |
| 2008/0037722 A1 | 2/2008 | Klassen |
| 2008/0039053 A1* | 2/2008 | Polozola ............ H04L 12/1895 455/412.2 |
| 2008/0051067 A1* | 2/2008 | Kwon .................. H04M 3/533 455/413 |
| 2008/0126951 A1 | 5/2008 | Sood et al. |
| 2008/0198980 A1* | 8/2008 | Skakkebaek .......... H04M 3/537 704/E15.045 |
| 2008/0200152 A1 | 8/2008 | Moore |
| 2008/0219414 A1 | 9/2008 | Ramamoorthy et al. |
| 2008/0249778 A1 | 10/2008 | Barton et al. |
| 2008/0260118 A1 | 10/2008 | Lyle |
| 2009/0054031 A1 | 2/2009 | Smith et al. |
| 2009/0076832 A1* | 3/2009 | Collins .................. G06Q 10/00 705/1.1 |
| 2009/0086631 A1 | 4/2009 | Jayapalan et al. |
| 2009/0086936 A1 | 4/2009 | Clifford et al. |
| 2009/0147937 A1* | 6/2009 | Sullhan .............. H04M 3/42229 379/201.02 |
| 2009/0197622 A1 | 8/2009 | Atarius |
| 2009/0201886 A1 | 8/2009 | Lee et al. |
| 2009/0203361 A1 | 8/2009 | Huang et al. |
| 2009/0274279 A1 | 11/2009 | Reynolds |
| 2010/0023472 A1 | 1/2010 | Loeb |
| 2010/0054433 A1 | 3/2010 | Gustave et al. |
| 2010/0056110 A1 | 3/2010 | Liu et al. |
| 2010/0138357 A1 | 6/2010 | Mufti-Bey |
| 2010/0153114 A1 | 6/2010 | Shih et al. |
| 2010/0189228 A1 | 7/2010 | Seyfetdinov |
| 2010/0241663 A1 | 9/2010 | Huang et al. |
| 2010/0254263 A1 | 10/2010 | Chen et al. |
| 2010/0299761 A1 | 11/2010 | Shapiro |
| 2010/0318441 A1 | 12/2010 | Harper |
| 2011/0106894 A1 | 5/2011 | Hodge et al. |
| 2011/0286585 A1 | 11/2011 | Hodge |

(56) References Cited

U.S. PATENT DOCUMENTS

| | | | |
|---|---|---|---|
| 2011/0286591 | A1 | 11/2011 | Fulton et al. |
| 2012/0094680 | A1 | 4/2012 | Stackelius et al. |
| 2012/0202454 | A1 | 8/2012 | Smith et al. |
| 2013/0058274 | A1 | 3/2013 | Scherzer et al. |
| 2013/0162423 | A1 | 6/2013 | Rowe et al. |
| 2013/0179949 | A1 | 7/2013 | Shapiro |
| 2013/0246535 | A1 | 9/2013 | Yadava et al. |
| 2014/0020063 | A1 | 1/2014 | Hodge et al. |
| 2014/0044242 | A1* | 2/2014 | Hodge .............. H04M 3/42229 379/68 |
| 2014/0280631 | A1 | 9/2014 | Torgersrud |
| 2015/0043721 | A1 | 2/2015 | Hodge et al. |
| 2015/0046978 | A1 | 2/2015 | Hodge et al. |
| 2015/0047004 | A1 | 2/2015 | Hodge et al. |
| 2015/0066523 | A1 | 3/2015 | Pan |
| 2015/0103990 | A1 | 4/2015 | Lee |
| 2015/0181489 | A1 | 6/2015 | Chong et al. |
| 2015/0201080 | A1 | 7/2015 | Hodge et al. |
| 2015/0201081 | A1 | 7/2015 | Hodge et al. |
| 2015/0215254 | A1 | 7/2015 | Bennett |
| 2015/0223705 | A1 | 8/2015 | Sadhu |
| 2016/0142537 | A1 | 5/2016 | Hodge et al. |
| 2016/0156625 | A1 | 6/2016 | Hodge et al. |
| 2016/0381082 | A1 | 12/2016 | Hodge et al. |
| 2017/0127257 | A1 | 5/2017 | Saxena et al. |
| 2017/0142258 | A1 | 5/2017 | Seyfetdinov |
| 2017/0279857 | A1 | 9/2017 | Hodge et al. |
| 2017/0302756 | A1 | 10/2017 | Chou et al. |
| 2017/0324834 | A1 | 11/2017 | Hodge |
| 2018/0213090 | A1 | 7/2018 | Hodge et al. |
| 2018/0331987 | A1 | 11/2018 | Hodge |
| 2019/0132364 | A1 | 5/2019 | Hodge et al. |
| 2020/0252438 | A1 | 8/2020 | Hodge et al. |
| 2021/0021554 | A1 | 1/2021 | Hodge |

FOREIGN PATENT DOCUMENTS

| | | |
|---|---|---|
| WO | WO 99/21330 A1 | 4/1999 |
| WO | WO 99/48054 A1 | 9/1999 |

OTHER PUBLICATIONS

"Cisco IAD2400 Series Business-Class Integrated Access Device", Cisco Systems Datasheet, 2003.

"SIP and IPLinkTM in the Next Generation Network: An Overview," Intel, 2001.

"Voice Over Packet in Next Generation Networks: An Architectural Framework," Bellcore, Special Report SR-4717, Issue 1, Jan. 1999.

"Criminal Calls: A Review of the Bureau of Prisons' Management of Inmate Telephone Privileges," U.S. Department of Justice, Office of the Inspector General, Aug. 1999.

"Why Can't You Make a Collect Call to a Cell Phone," National Public Radio, Jun. 30, 2008, Accessed via http://www.npr.org/templates/story/story.php?storyId=92021561 on Apr. 6, 2015.

1800MumDad.com.au—Explanation, Aug. 29, 2007—Retrieved from the Internet Archive Wayback Machine at https://web.archive.org/web/20070829114354/http://1800mumdad.com.au/main.php?type=charges2; 2 pages.

1800MumDad.com.au—Summary Standard Form of Agreement, Apr. 26, 2006—Retrieved from the Internet Archive Wayback Machine at https://web.archive.org/web/20060426180115/http://www.1800mumdad.com.au/main.php?type=summarysfoa; 3 pages.

Ahimovic et al., "Services for Tomorrow's PCS," IEEE International Conference on Universal Personal Communications, vol. 1, Oct. 12-15, 1993; pp. 222-227.

Brown, et al., "SMS: The Short Message Service," Computer, vol. 40, No. 12, 2007.

BubbleLINK® Software Architecture (Science Dynamics 2003).

Bur Goode, Voice Over Internet Protocol (VoIP), Proceedings of the IEEE, vol. 90, No. 9, 1495-1517 (Sep. 2002).

Clifford J. Weinstein, MIT, The Experimental Integrated Switched Network—A System-Level Network Test Facility (IEEE 1983).

Commander Call Control System, ReV. 1.04 (Science Dynamics 2002).

Confalone et al., "Calling Card Service—TSPS Hardware, Software, and Signaling Implementation," The Bell System Technical Journal, Sep. 1982, vol. 61, No. 7; pp. 1675-1714.

Digital Copy of "Bellcore Notes on the Networks," Bellcore, Special Report SR-227 5, Issue 3, Dec. 1997.

Excerpts from the Prosecution History of U.S. Appl. No. 10/135,878, filed Apr. 29, 2002.

Reexamination U.S. Appl. No. 90/012,802 of US. Patent No. 8,190,121, filed March 1, 2013.

Garner, et al., "Mobile Terminated SMS Billing—Exploits and Security Analysis," IEEE International Conference on Information Technology: New Generations, 2006.

Jeff Hewett and Lee Dryburgh, Signaling System No. 7 (SS7/C7): Protocol, Architecture, and SerVices (Networking Technology) at 85 (Cisco Press, June 2005).

McKitterick et al., "State of the Art ReView of Mobile Payment Technology," Department of Computer Science, Trinity College Dublin; 22 pages.

Operator Service System Generic Requirements, OSSGR, TR-TSY-000271, Collect Billing, Rev. 3, Mar. 1988, 50 pages.

Osifchin, N., "A Telecommunications Buildings/Power Infrastructure in a New Era of Public Networking," IEEE 2000.

PacketCableTM 1.0 Architecture Framework Technical Report, PKT-TR-ARCH-V0 1-001201 (Cable Television Laboratories, Inc. 1999).

Pages from http://www.corp.att.com/history, archived by web.archive.org on Nov. 4, 2013.

Photocopy of "Bellcore Notes on the Networks (Formerly BOC Notes on the LEC Networks)," Bellcore, Special Report SR-2275, Issue 3, Dec. 1997.

Prosecution History of U.S. Appl. No. 11/045,589, filed Jan. 28, 2005.

Rey, R.F., ed., "Engineering and Operations in the Bell System," 2nd Edition, AT&T Bell Laboratories: Murray Hill, NJ, 1983.

Schwartz, et al., "How to Build an SMS Service," O'Reilly Short Cuts, 2007.

Science Dynamics, Inmate Telephone Control Systems, http://scidyn.com/fraudprev_main.htm (archived by web.archive.org on Jan. 12, 2001).

Science Dynamics, SciDyn BubbleLINK, http://www.scidyn.com/products/bubble.html (archived by web.archive.org on Jun. 18, 2006).

Science Dynamics, SciDyn Call Control Solutions: Commander II, http://www.scidyn.com/products/commander2.htrnl (archived by web.archive.org on Jun. 18, 2006).

Science Dynamics, SciDyn IP Gateways, http://scidyn.com/products/ipgateways.html (archived by web.archive.org on Aug. 15, 2001).

Science Dynamics, Science Dynamics—IP Telephony, http://www.scidyn.com/iptelephony_maim.htm (archived by web.archive.org on Oct. 12, 2000).

Sundstrom, K., "Voice over IP: An Engineering Analysis," Master's Thesis, Department of Electrical and Computer Engineering, University of Manitoba, Sep. 1999.

The Line Information Database (LIDB) and Wireless Services, Telcordia Technologies White Paper, Dec. 2001, 31 pages.

U.S. Appl. No. 60/607,447, "IP-based telephony system and method," to Apple, et al., filed Sep. 3, 2004.

U.S. Appl. No. 60/935,634, "Method of Enabling an SMS Text Message to Facilitate Payment on a Cellular Bill for a Billable Call Received on a Cell Phone," to Martin, et al., filed Aug. 23, 2007.

Valcourt, et al., "Investigating mobile payment: Supporting technologies, methods, and use," IEEE International Conference on Wireless and Mobile Computing, Networking, and Communications, 2005.

Wireless Interconnection and Reciprocal Compensation Agreement Between Community Telephone Company and United States Cellular Corporation, Apr. 24, 2006, 29 pages.

(56) References Cited

OTHER PUBLICATIONS

Advanced Technologies Group, Inc, White Paper: Introduction to Advanced Technologies Group, Inc., Inmate Correspondence System, Aug. 5, 2002, American Corrections Association Annual Conference, Anaheim, California.

Advanced Technologies Group, Inc., Correspondence System Poster, published Jul. 29, 2002 by Exhibit-Resources Midwest, displayed at Aug. 2002 American Corrections Association Annual Conference, Anaheim, California.

Advanced Technologies Group, Inc., Offender Management Suite: Correspondence System Brochure, printing invoice dated Aug. 2, 2002, brochure distributed at Aug. 2002 American Corrections Association Annual Conference, Anaheim, California.

Avtalion, J., "Keeping tabs on call centres," Telecommunications, vol. 31, No. 7, Jul. 1997, pp. 70-72.

Creps, et al., "Is somebody watching? Employee communications and privacy," Risk Management vol. 44, No. 4, Apr. 1997, pp. 22-28.

English-language Abstract for European Patent Publication No. 0989720 A1; 2 pages.

Excerpts from U.S. Appl. No. 60/538,933 to Shapiro, filed Jan. 22, 2004, 7 pages.

Henry, M., "Unethical staff behavior," Corrections Today, vol. 60, No. 3, Jun. 1, 1998.

International Search Report and Written Opinion directed to International Patent Application No. PCT/US2016/018653, dated May 30, 2016; 11 pages.

International Search Report and Written Opinion directed to International Patent Application No. PCT/US2017/031321, dated Jul. 14, 2017; 13 pages.

Maghan, J., "Intelligence Gathering Approaches in Prisons," Low Intensity Confict & Law Enforcement, vol. 3. No. 3, 1994, pp. 548-557.

Procops, T., "Advanced call logging for public safety organizations," Public Management, vol. 82, vol. 3, Mar. 2000, pp. 17-19.

Shearer, G., "How logging and monitoring technologies improve quality in a call center," Telemarketing & Call Center Solutions, vol. 16, No. 7, Jan. 1998, pp. 92-101.

Smith, M., "Corrections Turns Over a New LEAF: Correctional Agencies Receive Assistance From the Law Enforcement Analysis Facility," Corrections Today, Oct. 1, 2001.

U.S. Appl. No. 15/288,520, "Electronic Messaging Device," to Hodge et al., filed Oct. 7, 2016.

U.S. Appl. No. 60/036,689, filed Jan. 31, 1997, titled Database Origami.

U.S. Appl. No. 60/246,070, "Employee Online Activity Monitoring System," to Mcfarlane, et al., filed Nov. 7, 2000.

U.S. Appl. No. 60/500,725, "SMS Message Processing," to Claudatos, filed Sep. 4, 2003.

Web pages from "Electronic Message Solutions Inc. (EMS): Improving Relationships through faster Correspondence," 2004, 9 pages; retrieved from http://www.inmatemail.com.

Wenndt, et al., "Content recognition for telephone monitoring," Proceedings of the SPIE—The International Society for Optical Engineering, vol. 4232, 2001, pp. 274-80.

\* cited by examiner

SYSTEM AND METHOD FOR ELECTRONIC NOTIFICATION IN INSTITUTIONAL COMMUNICATIONS

CROSS-REFERENCE TO RELATED APPLICATIONS

This application is a continuation application of U.S. application Ser. No. 15/420,458, filed Jan. 31, 2017, which is a divisional application of U.S. application Ser. No. 12/321,893 filed Jan. 27, 2009, now U.S. Pat. No. 9,621,714, both of which are incorporated herein by reference in their entireties.

FIELD OF INVENTION

The invention relates generally to the field of telephone communication systems in penal institutions or similar facilities. In particular, the invention relates to a system and method of communication between an inmate and a third party that enables the third party to initiate a web-based contact request for a given inmate. Additionally, the system enables the inmate to automatically check for his/her call requests through an inmate telephone and electronically informs the third party when the inmate has been notified. Further, the invention electronically informs a third party if they have missed a call from a specific inmate.

BACKGROUND OF THE INVENTION

Generally, the need to monitor, control, record and provide detailed records of the usage of a telephone system in a controlled institutional environment is well recognized. It is common to utilize a controlled telephone system capable of monitoring outgoing telephone connections in many types of institutional environments, including penal institutions, military institutions, hospitals, schools, businesses, specific types of government institutions, etc.

The reasons for monitoring and controlling institutional telephone systems are evident. To prevent such institutions from incurring unaccountable telephone costs, the institutions must either restrict access to outbound telephone lines or employ a telephone monitoring system to charge the responsible party for making the outbound communication. Otherwise, unaccountable telephone costs would severely hinder the availability of the telephone systems in institutions. However, the restrictions utilized by these systems result in overall inefficiency as two-thirds of the attempted calls go unanswered presenting a problem for both the system's users and the institution.

It is imperative for many institutions to utilize a communication system that provides an accurate identification means for administrators to determine the individual responsible for each outbound telephone call. A communication system must also be able to monitor communications and maintain a useful record of the communications. Additionally, the system should include the ability to restrict access or provide options to particular users. Considering the number of users in a large institution, different payment methods available and the excessive call volume at many institutions, it is evident that an effective telephone management system is essential.

Providing telephone systems in specific types of highly restricted institutions, such as penal institutions, results in the consideration of numerous additional complicating factors. Generally, the government heavily regulates outbound communications in penal institutions. Therefore, communication systems implemented in penal institutions or similar facilities must meet greater security requirements often mandated by regulatory bodies affiliated with the county, state or federal institution. Thus, the communication system used in a regulated institution must employ unique functions often unnecessary in other types of institutions.

In its most general form, a penal institution's telephone system utilizes a call processor to approve and place a call, surveillance equipment or monitoring equipment, and a recording device for evidencing the conversation. Generally, these simple systems are not equipped to restrict an inmate from calling an individual. However, it is preferable for the call system devices now employed in such institutions to have the capability to thwart an inmate from calling certain specific individuals or types of individuals. Systems currently exist capable of controlling calls. It is well documented that without the necessary constraints on an inmate's use of the telephone system, inmates have often harassed outside parties or individuals. For example, it is generally preferred that an inmate be prevented from placing a telephone call to the prosecutor who prosecuted the inmate's case or another attorney responsible for the sentencing of the inmate. In another example, it may be preferred that an inmate be prevented from contacting the victim of the inmate's crime or witnesses from the inmate's case. Additionally, inmates have used previous penal institution call systems to perpetrate additional criminal activities such as fraudulent schemes or specific criminal' conspiracies. Specifically, inmates have been known to arrange credit card fraud attempts, the smuggling of contraband into the facility, and have even been known to arrange escape attempts over the penal institution's telephone system. Therefore, it is critical that an efficient penal institution carefully monitor all outgoing telephone calls making a regulated penal institution telephone system a necessity.

Another concern in implementing an efficient institution telephone system is cost control. In order for a system to be cost effective, the system must critically monitor and record the activities of each individual user in order to properly charge each individual caller for his or her outgoing calls. Typically, telephone communication systems in penal institutions provide an inmate with a telephone account upon arrival. There are several options for an inmate to select with respect to payment on the account. For example, an inmate may place prior personal earnings into the account. The cost of each call is then deducted from the total amount in the inmate's account until no balance remains. The inmate may also choose to utilize collect call means. In addition, an inmate may be assigned a commissary account, where funds are added to the account based on work performed by the inmate. As the funds increase, the inmate may apply these funds to the cost of placing telephone calls. The inmate debit account may be located onsite, at a central office facility, or at a third-party site.

The inmate's family may alternatively control the inmate debit account. For example, the inmate's family may control the inmate's access to the debit account either remotely (e.g., by using the Internet, accessing a toll-free/pay to dial telephone number, using a mail form, etc.) or by visiting the prison facility. The inmate's family may add funds to the debit account and thereby control the call volume allowed to the inmate.

Another requirement of a secure telephone management system in a penal institution is the accurate identification of the telephone call participants. Generally, it is common in a penal institution to assign each inmate a personal identification number ("PIN"). When an inmate attempts to place a telephone call, the inmate must supply a valid PIN to gain access to the telephone system. Other systems include requiring personal information in addition to a PIN to be supplied by the inmate/user. For example, a user might be prompted to supply a PIN as well as certain information that may only be known to the user. A common example is a request by the call system to provide their mother's maiden name.

Another required feature of a telephone management system for a penal institution or similar facility is a means for restricting calls placed by a user (e.g., an inmate). It is well documented that inmates often try to harass individuals related to their arrest or confinement, such as judges, prosecutors, witnesses, etc., through telephonic communications. Penal institutions have attempted to prevent this harassment by restricting the telephone numbers each inmate is able to access. For example, a system may utilize a PIN or other identification means to, access a list of telephone numbers that the inmate may not call, or alternatively, the system may access a list of numbers that the inmate is authorized to connect to (i.e., the inmate can only call the numbers appearing on the list). Telephone numbers placed on the restricted list can include any individual related to the conviction (e.g., the arresting police officer, the prosecuting attorney, etc.), while telephone numbers placed on the permitted list may include, for example, close family relatives. The system may also limit the amount of time each inmate/user is permitted to conduct each outbound telephone call through the system. Furthermore, restrictions may be regularly updated. For example, if an inmate misbehaves, the inmate's telephone privileges may be further limited or revoked completely.

Penal institutions are also concerned with monitoring the activities and communications of inmates. Monitoring telephone activities is necessary to restrict connections to illegal activities outside of the institution. Three existing types of call monitoring techniques are known in the art. The first technique is live monitoring. Live monitoring requires an operator or other individual to listen to each telephone call and alert the proper authorities if necessary.

The second type of monitoring involves recording the telephone conversation via a common recording device. A common example is a recording device such as a magnetic tape drive or a computer hard drive. This type of monitoring may be continuous or intermittent depending on the degree of security required for each inmate.

The third type of monitoring is known as passive monitoring. Passive monitoring may be activated when certain keywords are spoken. In addition, passive monitoring may be activated if the telephone call at the termination end is transferred to a third party via certain known detection means such as silence detection, hook-flash detection, etc.

Penal institutions currently record most inmate telephone calls, with the exception of lawyer-inmate communications, which are generally prohibited by law. Typically, in the art, monitoring may occur using any combination of the three methods (e.g., live monitoring, electronic recording monitoring or passive monitoring). It can be advantageous to flag certain individuals in an inmate's profile as highly suspicious. If the inmate initiates communication with the flagged individual, the system will alert a live operator to monitor the system. In such a system it is essential that the system correctly identify the called individual to avoid unnecessary expenditure of live operators.

Alternatively, the inmate telephone call system may utilize a remote-alert notification system wherein the system contacts an operator when a violation has occurred. The system may contact the operator utilizing telephone means, paging means, computer means, etc. This notification system may be set to call the operator a limited number of times or until the alert has been noted in the inmate telephone call system. The operator may then access information about the alert remotely using the telephone, Internet, or any other such remote access means.

In order to alleviate some of the problems and concerns discussed herein, many penal institutions have implemented certain task-specific advanced systems. Generally, these "advanced" systems known in the art comprise several features. For example, it is known in current systems to employ permanent call blocking. Specifically, it is known in the art to block an inmate or group of inmates from dialing certain telephone numbers. Most systems also prevent inmates from talking directly to live operators. This prevents inmates from requesting that the operator forward a call or provide additional telephone numbers allowing inmates to harass or locate additional parties. Furthermore, current systems block "1-800," "1-900" and other like telephone numbers including toll-free and pay to-dial telephone numbers. In addition, certain institutions may elect to block country codes, specific area codes, or other third-party numbers.

Current systems known in the art may also utilize a feature commonly referred to as "selective" call blocking. As discussed, "selective" call blocking may be employed to thwart inmates from establishing a connection with a selected group of individuals (i.e., with the home telephone of prison guards, wardens, indictment witnesses, trial witnesses, police officers, judges, etc.). It is also foreseeable that the telephone numbers of the family members of these specific individuals may also be blocked.

Some current systems also limit the use of specific long distance carriers. This feature proves useful in limiting unnecessary costs incurred by employing alternate carriers.

Other current systems utilize features commonly referred to as "hook flash" prevention or "click" and "pop" prevention modes. These systems prevent inmates from extending the current outgoing telephone call and entering a new telephone call with a new number without fully terminating the original telephone call. For example, this feature prevents an inmate from utilizing common call forwarding features and the like.

In addition, some current institutional telephone systems electronically or manually disable the keypad after a telephone number is dialed and the telephone call is connected. This feature prevents inmates from interacting with telephone games and lotteries, and in certain older systems, prevents the inmate from achieving an unrestricted dial tone.

Another common feature employed by institutional systems is three-way call prevention. This feature prevents an inmate from instructing the called party to bridge the telephone call to another telephone number.

Other known systems in the art may exhibit other regulatory features. For example, telephone communication systems generally allow an institution to limit the duration of a telephone call or to limit the cost of the telephone call. These types of features further allow a facility to customize the telephone call systems thereby preventing unrecoverable expenditures.

Another control used by current institution telephone systems is the use of certain aspects of biometric recognition for the identification of users or inmates (i.e., the calling party). It may be beneficial for communication systems in penal institutions to incorporate biometrics as an additional security device. Biometric recognition is commonly available in a number of fields. For example, biometrics recognition has found a number of security uses, including common usage, in credit card systems and building security systems. Biometric information includes fingerprints, hand geometry, voiceprints, retinal patterns, iris scans, signatures, infrared facial patterns, and all other sources which constitute unique physiological characteristics and which can assist in establishing a person's identity. Various devices exist which can scan one or more biometric characteristics and digitize the information.

Generally, while much effort has been made to establish controlled inmate telephonic communication, inmate call management, systems are inefficient. Studies have shown that approximately two-thirds of all calls attempted by an inmate to an outside party are not answered by a live party (i.e., no answer or an answer by an automated message machine). These unanswered calls present a problem for inmates as they often count against their monthly limit thereby reducing the time available for inmates to talk to such people as family members. Currently, the Federal Bureau of Prisons has a three hundred (300) minute per month limit for many inmates. It may take the inmate several attempts to successfully contact an outside party or the inmate may never successfully contact a desired outside party.

In addition, inmates and their outside contacts often complain of the difficulty to communicate via live telephone conversations as they are often several time zones away from each other. Due to the lack of successful completions of calls (i.e., only one-third of attempted calls are successful), inmates try to find a way to get around the system resulting in even more restrictions placed on usage of the system. Additionally, these unanswered calls present a loss of revenue for the institution, as it is difficult to charge for system usage if the call is not answered.

A system is thus desirable that increases the care and efficiency of communication between inmates and third parties. The system notifies the third parties when an inmate has tried to contact them. The system also allows the third party who receives the notification to reply with a message to the inmate. The system further enables authorized third parties to access the system and request to contact an inmate at any time, regardless of whether the inmate has tried to contact the third party. Advantageously, this will increase efficiency as well as generate an additional revenue stream for the institution. However, due to factors such as government regulations, such a system must be monitored and controlled in similar manners to current call management systems. The system also allows for live talk between the inmate and outside party if the third party answers the call, record the conversation as necessary, bill for usage of the system, etc.

One system known in the art discloses an automatic account number validation and billing management system. The system prompts a user for an account number and compares the number inputted to a number stored in a database to determine validity. If the account number is valid and found in the database, the system completes the predetermined telephonic connection. If the number is not in the database, and therefore invalid, the system will utilize voice prompts to request re-entry of the number or provide further instructions. The system attempts to locally automate and simplify the process of payment for routing calls without live operator assistance, but does not address additional security concerns that may exist in specific facilities, such as in a penal institution. Furthermore, it does not provide for protection measures to confirm that the individual supplying the account number is the individual entitled to the use of the account. In such a hostile environment as a penal institution, an account number may easily be obtainable through coercion or by force. The system does not provide any means of monitoring the conversations taking place or restricting which individuals are accessed by the user. Additionally, the system does not provide means for contact request from a third party for a specific inmate or notification to an outside party if the inmate's call is unanswered.

Another system known in the art discloses a call management system enabling prepayment of telephone calls utilizing a debit system. Specifically, a user of the system obtains a special code by depositing a prepayment. The prepayment is stored in a database for use in verifying calling party calls. To access the system, a user dials a special number and inputs a user-specific code for verification followed by the number of the party to be called. Next, the code is verified by the system. If verification is successful and sufficient funds are available, the call is connected. The prepayment amount, minus deductions for the running cost of the call, is tabulated as the call progresses. The call terminates either when the prepaid funds are exhausted in the user's account or when either party disconnects. The invention also includes steps to prevent the same access code from being used at different terminals. However, the system does not teach a means for selecting the call type or a call monitoring means. It also fails to teach an advanced verification means specific to a user. Further, it does not provide a means of notification to the outside party if the inmate's call is not answered.

Yet another system known in the art teaches a multilingual prepaid telephone system capable of interfacing with a public switched telephone network. In the system, each user is assigned a PIN and a credit account. A user first dials a number to access the telephone system and chooses a language for all subsequent voice prompts. The user then supplies a PIN, which is compared against a list of numbers in a database. If sufficient credit is available for the duration of a telephone call to the destination number, the connection is completed and a timer is set for the available duration of the call. The call terminates either when the allowed amount of time for the call expires or if one party member hangs up the telephone line. If the latter situation occurs, the system computes a new available credit balance for the user's account. However, the system fails to provide a selection means for the user, such as the ability to choose the type of call to be placed (e.g., collect, debit, international, etc.): It also fails to teach any call monitoring means and would therefore be unacceptable as a communication system for a penal institution. Additionally, it does not teach any contact request/notification means.

Still another system discusses an integrated commissary system for receiving and processing orders in an institutional setting. The commissary system is designed for use without access to a PSTN. According to the system, user status and inventory status are stored in an onsite database. To access the database, a user provides identifier information and item selections through selected telephones. The selections are compared against the onsite database using a processor. If the user is authenticated and the requested items are available, the processor generates transaction records, updates user commissary information, and correctly adjusts inventory. The updated information is stored in a file that may be used for record keeping or archival purposes. However, the system does not teach a commissary system for use with a PSTN or any contact request/notification means. This system also fails to teach multiple authentication means and would therefore be unacceptable for use in a penal institution.

Still a different system known in the art discloses a software process for real-time call rating and debiting so that a subscriber's account balance is not exceeded. The method disclosed estimates the time when the user's balance will expire by using the total charge per second average. The process then determines the time remaining by dividing the account balance by the average charge per second of all telephone calls, and the time limit for the call is then set accordingly. This method is useful if the rate for long distance calls is not known locally. However, the system does not allow for other types of calls, such as collect calls, to take place. Further, it fails to provide an advanced call monitoring apparatus with an advanced authentication apparatus. Also, it fails to teach a multi-mode communication notification means with a specific contact.

There is also a system that depicts an automated public telephone control for charge or collect call billing. The apparatus embodies a microprocessor system controlling voice prompting, recognition of responses, network signaling, recording of calling details, and verification of account numbers. The disclosed invention provides for an automated telephone billing for public telephone systems. The system offers a plurality of billing methods, such as billing to a credit account number, to the called party (collect calling), or to a third party. An additional aspect of the invention describes the recognition of voice utterances from other signals and called party spoken words (i.e., the system can recognize the word "yes" when spoken by any individual). However, it does not identify or verify the individual speaking. Furthermore, this system does not provide a means to identify the user or verify that the user is not partaking in fraudulent activities. It also fails to teach of a monitoring, call control, and contact request/notification means.

Yet still another system depicts a collect call, system that can automatically route long distance calls without intervention of an outside service or operator. This feature enables private public telephone owners, as opposed to primary telephone companies, to receive revenue for completion of the call. The invention comprises the steps of providing the calling party with voice prompts, receiving voice or dialed signal information about the calling party in response to the voice prompts, locally, recording the information about the calling party, providing the called party information about the calling party, and reacting to a variety of provided signals by either the called or calling party. The system only provides a method and apparatus for placing collect calls. In addition, it avoids consideration of providing other possible payment methods. The system disclosed is further limited by its lack of telephone call monitoring ability and calling party identification means, and is therefore unsuitable for use in penal institutions.

Still a different system exemplifies the need for a control management and monitoring system in institutional settings. This system discloses a system for controlling, monitoring, recording and reporting telephone communications. The system deals primarily with the identification of a user through use of a PIN and restricting telephone communications through a profile accessed by the PIN. The system further contemplates means for monitoring and recording communications. However, the system only enables live talk between parties and provides no means for contact requests by an outside party for a specific inmate and notification if a call is unanswered.

Even another system is primarily concerned with incorporating an improved method of monitoring calls. The method includes a means for detecting tones commonly associated with call bridging and call forwarding attempts. For example, the system is directed to the detection of tones such as ring signals, busy signals, special information tones, dual tone multi-frequency tones, call progress tones or other similar tones characteristic of the placement of a telephone call. It is limited by detection of certain sounds, which may not be readily machine-recognizable. For example, it is foreseeable that interference, background noise, or compressed voice data may inhibit the detection of the tones. Also, the system does not teach any method for multi-mode communication notification means.

Another system known in the art describes a system for the verification of a calling party, called party and a secure connection. The invention includes the costly requirement of secure telephone devices known in the art. Specifically, the invention teaches a system wherein the calling and called parties supply voice data, which is encoded and transmitted over a telephone network. Both users hear the alternate party's recorded voice data and verify that the supplied voice data is correct. The call is established only if both parties verify that the called party has provided the correct voice data. However, it would be too costly to implement such a system in a penal institution or similar facility. Additionally, the system does not consider possible payment methods for calls or call management. For example, certain inmates may be entitled to call only a few particular individuals. A system within penal institutions, or similar facilities, must include a means for limiting the number of potential called parties and the specific parties to which inmates can call and provide a means for monitoring inmate call transactions.

Further, a different system discloses a system to permit users repetitive access to a multitude of systems. The system requires an initial enrollment phase for access. The enrollment phase consists of extracting biometric data to be stored for future use. The format of the data is compatible with a plurality of verification/identification systems. For example, in one embodiment, it describes a biometric recognition means including voice recognition, fingerprint identification, and retinal scan identification. However, it does not address restrictions to the system or further monitoring means during use of the system, which are essential for systems within a penal institution.

Finally, a system known in the art provides a methodology for a computerized telecommunications system for voice to text message storage for use in correctional facilities. This system receives an external message via either voice or text. There are two storage means: a voice message box or an email inbox. If a voice message is received, it passes as a regular telephonic voice message and is then stored as a voice message in the voice message box. If instead, the storage unit is an email box and a voice message is received, the voice message is converted to text and the message is then saved. The reverse happens if the message is a text message and the storage medium is a voice message box. If a text message is received and the inmate has an email inbox, the text message is saved as text. The inmate is then notified of the new message. This system can also allow the inmate to send either a text or a voice message to an external party. If the inmate leaves a voice message, no conversion occurs and the message is sent. However, if an inmate's message is in text form, either a text to voice conversion occurs before being sent to the outside party or the text message is sent to the external party. This system requires an external party have access to-the system to receive a contact request sent by an inmate. The external party must constantly check the system to determine whether they have new requests. Only upon accessing the system is the external party notified if there are any new requests. Further, the system requires that the inmate choose to either leave a contact request or attempt a live call. These drawbacks severely limit the system's functionality making it both inefficient and difficult to implement into institutional settings.

In view of the foregoing, there clearly exists a need for a method and apparatus for increasing the efficiency of an institution's telephone call system. Furthermore, there clearly exists a need for a telecommunication system for use in penal or similar institutions that incorporates the ability to handle calls not answered by a human, whether the calls are unanswered or answered by a communication notification system. Also, the system should allow outside parties for web initiated contact requests with a specific inmate and/or be notified through an existing inmate telephone system if they have missed a call from a specific inmate. In addition, there exists a need for a system and method to electronically notify the outside party when the inmate has been notified of the outstanding call request.

BRIEF SUMMARY OF THE INVENTION

The invention embodies a multi-function communication notification system for use in controlled call management systems.

The invention provides third party customers (i.e., outside parties trying to get in touch with a specific inmate) with the ability to initiate contact requests for a given inmate through the Internet. The system allows for incoming web initiated call requests notifying the inmate of a missed call. Once the third party customer has signed up for the call request in the system, the customer may follow specific instruction to initiate call requests for an inmate. Additionally, the invention allows the inmate to check for his/her outstanding call requests or the system may automatically inform the inmate of contact requests when he/she makes an outgoing call through an Interactive Voice response system. The Interactive Voice Response system notifies the inmate through a call request notification canned message to the inmate via the inmate telephone. Further, the invention allows messages to be sent to the third party indicating that the inmate has been notified. The message may be sent via email, SMS (Short Message Service also known as text messaging), telephone, instant messenger, etc. The message may include information such as that the given inmate has been notified of the contact request.

Additionally, the invention allows a message to be sent to the third party if and when they have missed a call from the specific inmate. If the third party customer has signed up for email notifications through the system, then the system notifies the third party indicating that they have missed a call from a specific inmate. The message may be sent via email, SMS, telephone, instant messenger, etc.

In addition, the system provides the ability to control, monitor, record and report information relating to communication in an institutional based telecommunication network. The system may further implement a debit card platform or other such payment methods. The system of the invention may be implemented in a variety of facilities including penal institutions or similar facilities such as mental institutions, nursing homes, rehabilitation centers, correctional facilities, government agencies, private and public businesses and the like.

The invention is advantageous for both the institution and the inmates. It is not possible for an institution to charge for unanswered calls. The invention solves this problem and thus provides an additional revenue stream for the institution from the inmates and their contacts that use the system (i.e., reduces the institution's losses on unanswered calls). From the inmate's perspective, it becomes much easier to communicate with outside contacts by substantially improving the efficiency of institutional call management systems. The inmates and outside contacts can maintain contact when inmate-calling schedules conflict with outside contact schedules. Further, the invention enables inmates with call limits to be notified when a third party is trying to make contact. Advantageously, easier and more efficient communication has been found to foster less agitated behavior and help in an inmate's rehabilitation process.

Institutional-call management systems generally require acceptance from the called party before allowing the caller to communicate with the called party. However, in current call management_ systems, when an inmate places a call and a call is answered by an automated answering device or the call goes unanswered, the inmate cannot leave a message because, among other things, the automated answering device cannot enter the positive acceptance digit required by institutional call management systems (e.g., "If you would like to accept this call, press 1."). Upon no answer or an answer by an automated answering device, the invention provides the recipient of the call from the inmate with a notification (via email, SMS, telephone, instant messenger, etc.) that a call has been missed. The recipient can select how they would like to be notified via an enrollment process. If the third party wishes to contact the inmate, they may initiate a contact request to notify the inmate.

Upon making contact with an automated answering device, the system will send a notification to the called party that they missed a call from the specific inmate. When the called party chooses to send a contact request for the specific inmate, the system prompts the called party to enter his or her pre-existing account information or set up a new account. Once the called party enters the proper account information or sets up an account, the called party sends a contact request after which the inmate is notified. The contact request may be web initiated, telephone initiated, SMS, instant messenger, etc. Also, an outside contact meeting the requirements set forth by the institution for communicating with an inmate can access the system at any time and send a contact request for that inmate.

Preferably, the appropriate account is charged on a per call request basis for usage of the system. However, several other methods for billing for usage of the system may be utilized, including, but not limited to, deducting the funds each time a contact request is initiated, charging a monthly service fee, deducting funds based on a per minute fee, or charging a monthly base fee plus a deducting funds on a per minute basis. Additionally, prepaid accounts are preferably created that allows for billing for system usage based on the aforementioned methods.

Therefore, it is an object of the invention to provide a more efficient call management system for use in penal institutions and the like.

It is yet another object of the invention to provide a method for allowing third parties to make web-initiated contact requests for a specific inmate.

Yet another object of the invention is to allow inmates to check their web-initiated contact requests.

It is yet another object of the invention to allow inmates to be automatically notified from the inmate phone of web-initiated contact requests.

It is yet another object of the invention to electronically notify the third parties when the inmate has been notified of the contact request.

Still yet another object of the invention is to provide security authentication for users of the system.

Another object of the invention is to enable third parties to be notified if a call from a specific inmate has been missed.

Further, it is another object of the invention to enable outside contacts to block calls or contact requests from an inmate.

It is yet another object of the invention to monitor and record communication between an inmate and outside contacts.

Still another object of the invention is to perform a security check on sent and received contact requests.

Yet another object of the invention is to provide a billing means for usage of the system.

It is further an object of the invention to enable outside parties to set up an account.

Finally, it is an object of the invention to enable the multi-mode communication notification system to be easily incorporated into inmate telecommunication systems.

In one non-limiting aspect of the invention, a method of institutional web-initiated contact request is provided comprising the steps of: providing a user secure web access to a call management system; enabling the user to create web-initiated contact requests; sending by the user a contact request through a web browser; receiving by the user an electronic notification when the contact request has been delivered.

In a second non-limiting aspect of the invention, a method for outbound email notifications in a controlled environment is provided, the method comprising the steps of: providing a first party secure access for message exchange; verifying the second party as indicative of an acceptable party; allowing the first party to place a telephone call to the second party; allowing the first party to select a prerecorded message for the second party; and notifying the second party electronically of the recorded message left by the first party.

In a third non-limiting aspect of the invention, a call management system is provided comprising: at least one network connection; at least one telephonic instrument; at least one routing means coupled to the telephonic instrument; and a control platform; wherein the control platform includes one or more apparatuses for the purposes of monitoring, recording, controlling, storing, and billing related to telephonic communication between a plurality of local and remote users; and wherein the control platform enables the local user to receive contact requests.

Other objects, features, and characteristics of the invention, as well as methods of operation and functions of the related elements of the structure, and the combination of parts and economies of manufacture, will become more apparent upon consideration of the following detailed description with reference to the accompanying drawings, all of which form part of this specification.

BRIEF DESCRIPTION OF THE DRAWINGS

A further understanding of the invention can be obtained by reference to a preferred embodiment set forth in the illustrations of the accompanying drawings. Although the illustrated embodiment is merely exemplary of systems for carrying out the invention, both the organization and method of operation of the invention, in general, together with further objectives and advantages thereof, may be more easily understood by reference to the drawings and the following description. The drawings are not intended to limit the scope of this invention, which is set forth with particularity in the claims as appended or as subsequently amended, but merely to clarify and exemplify the invention.

For a more complete understanding of the invention, reference is now made to the following diagrams in which.

DETAILED DESCRIPTION OF THE INVENTION

As required, a detailed illustrative embodiment of the invention is disclosed herein. However, techniques, systems and operating structures in accordance with the invention may be embodied in a wide variety of forms and modes, some of which may be quite different from those in the disclosed embodiment. Consequently, the specific structural and functional details disclosed herein are merely representative, yet in that regard, they are deemed to afford the best embodiment for purposes of disclosure and to provide a basis for the claims herein, which define the scope of the invention. The following presents a detailed description of the preferred embodiment (in addition to some alternative embodiments).

Figure 1:
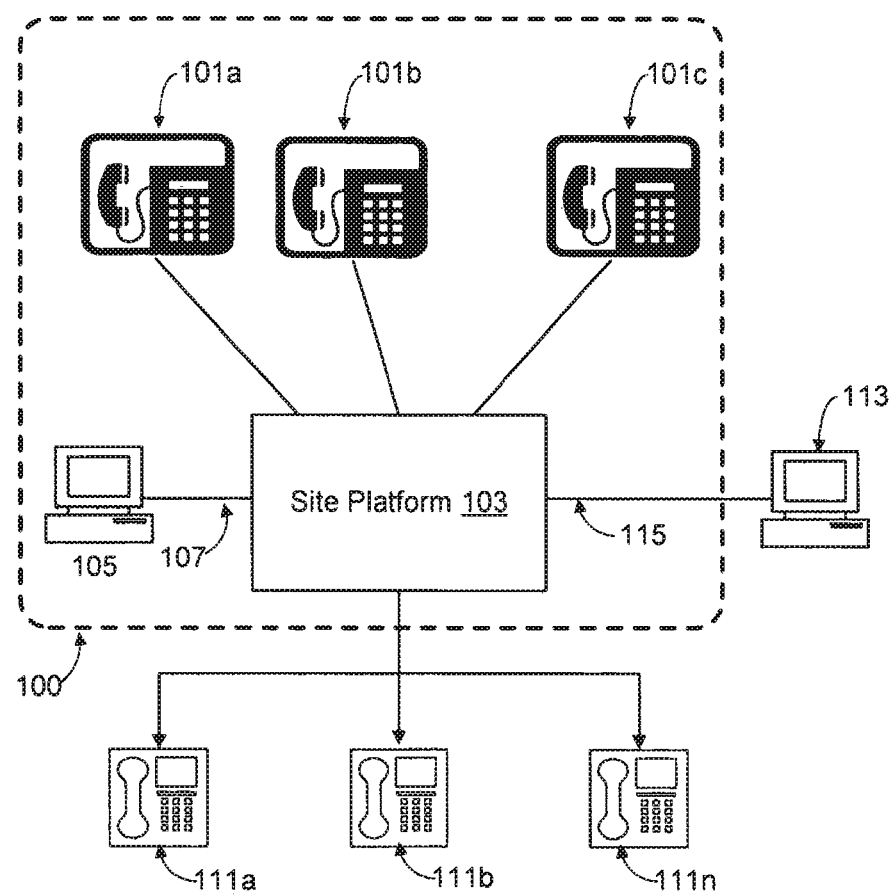
FIG. 1 depicts a block drawing of the preferred embodiment of an inmate call management system according to the invention.

Referring to FIG. 1, depicted is a block diagram of an exemplary inmate call management system 100 and preferably, includes site platform 103 operably connected to an administrative workstation 105 via connection 107 and is also connected to a third-party computer system 113 via connection 115. Particularly, site platform 103 includes a site server that has software to provide third-party restricted access to site platform 103 in order to generate web-initiated contact requests as will be shown and described below. It should be appreciated that connections 107 and 115 are preferably LAN connections, however in other non-limiting embodiments, a wireless connection may also be utilized.

Also, site platform 103 is connected via connection 115 to a remote third-party user through third-party computer system 113. Site platform 103 allows a third party to create a call-request account on site platform 103 to create call requests via, in one non-limiting embodiment, the Internet through a web browser. The third party creates the call-request account by creating an account in an accounting system located in site platform 103, which authorizes the third party to send and receive web-initiated contact requests. Also, the accounting system, preferably, bills for usage as appropriate although monthly billing may also be provided to utilize this feature. The third-party account is associated with the third party's telephone number and provides a third party to notify an inmate of a call request.

A third party may access site platform 103 through a web browser located on third-party computing system 113 and create a call-request account (hereinafter "account") associating the third-party telephone number with the account. This account authorizes the third party to send web-initiated contact requests as well as receive notification that a contact request has been received by the inmate (i.e., the inmate has listened to the contact request). Additionally, the third party may request, in one example, an email notification be sent to the third party if a call is not answered that has been initiated by the inmate. Other embodiments' may utilize an SMS notification, an Internet messenger notification, or other similar types of notification. Once the account has been set-up, a third party may access site platform 103 through web browser and create a call request by selecting from a list of canned messages, such as, for example, please call beck, do not call, etc. to send to the inmate. It should be appreciated by one of ordinary skill in the art that site platform 103 includes software to convert the canned message to an audio message to be subsequently played to the intended inmate when the inmate access call management system 100. Additionally, the site platform 103 notifies the third party when an inmate receives the canned message by sending, in one non-limiting example, an email to the third party although, an SMS text may also be sent to notify the third party indicating the inmate has been notified.

In addition, site platform 103 may incorporate firmware and software to route all inmate and call information through site platform 103 for efficient call transfer and efficient record keeping. It should also be appreciated that one of skill in the art will recognize that the call management system 100 is a multi-mode communication notification system utilized for notifying inmates of call requests as well as billing for inmate calls and may be incorporated into any call management system. Thus, FIG. 1 is merely an example of a call management system and is not intended to limit the scope of the invention.

In addition, depending on the memory requirements, site platform 103 may employ numerous site servers incorporating multiple processors. This allows call processing even after parallel component failure. The architecture also provides for a sharing of the load between processors, which eliminates system overload during extremely busy periods. The multiple processors enable the call processing system 100 to handle large volumes of calls at any time, and to ensure system integration. Also, site platform 103 stores digitized audio used for voice prompts in any commercially available database as well as each inmate user's call restrictions and other verification code required by the inmate user to access call management system 100.

Also as shown, administrative workstation 105 connects to site platform 103 via connection 107. Although only one administrative workstation 105 is shown, it is contemplated that multiple workstations 105 may be utilized by the system depending on institutional requirements. In addition, while administrative workstation 105 is shown onsite, it is also possible to access site platform 103 via the Internet through a web browser. Site platform 103 is controlled by software administered by administrative workstation 105. Administrative workstation 105 enables an administrator and authorized personnel to access account information, monitor calls, perform searches, etc. The workstation 105 may be used to listen to the outgoing telephone calls in real time or to access calls stored on a database or other type of storage means. It is also foreseeable that the functions controlled by site platform 103 may alternatively be controlled remotely at a central platform.

Also shown, site platform 103 connects to remote telephonic instruments 111a via connection 109. Connection 109 may be a Public Switched Telephone Network (PSTN), Voice over Internet Protocol (VoIP) connection, etc. depending on the requirements of the system. Further, one of skill in the art will recognize that the illustration of connection 109 is shown in a simplified form. Further, inmate call management system 100 includes a plurality of telephonic instruments 101a coupled to site platform 103, where "n" is an integer representative of the number of devices, site platform 103 is connected with, representing the desired capacity of call management system 100.

When an inmate wishes to check his outstanding call requests, he or she picks up telephonic instrument 101a. The site platform 103 prompts for identification information such as a Personal Identification Number (PIN) through an interactive Voice Response (IVR) system, although in other non-limiting embodiments, other identification means (not shown) may also be connected to telephonic instruments 101a such Radio Frequency Identification (RFID) technology and biometric identification means (i.e., fingerprint scanner, retinal scanner, voice analyzer, etc.). Once the platform 103 identifies the inmate, the inmate can check for any outstanding call requests. The system may also inform the inmate automatically if an external party has made a call request for the specific inmate. The IVR plays the call request notification (i.e., the audio version of the text-based canned message) and an email notification is send to the third party indicating that the inmate has been notified. In addition, site platform 103 preferably stores the call request session in a database.

When an inmate wishes to place a call, he or she picks up telephonic instrument 101a. The site platform 103 may, in one non-limiting example, prompt for identification information such as a Personal Identification Number (PIN) through an interactive Voice Response (IVR) system as was mentioned above. Once the platform 103 identifies the inmate, the inmate may make a call by dialing a telephone number that is associated with the third-party account that is stored in database on site platform 103. If the third party does not answer the call that has been initiated by the inmate, then the site platform 103 sends a canned message electronically to the third party (i.e., email notification) indicating they missed a call from a specific inmate.

Figure 2:
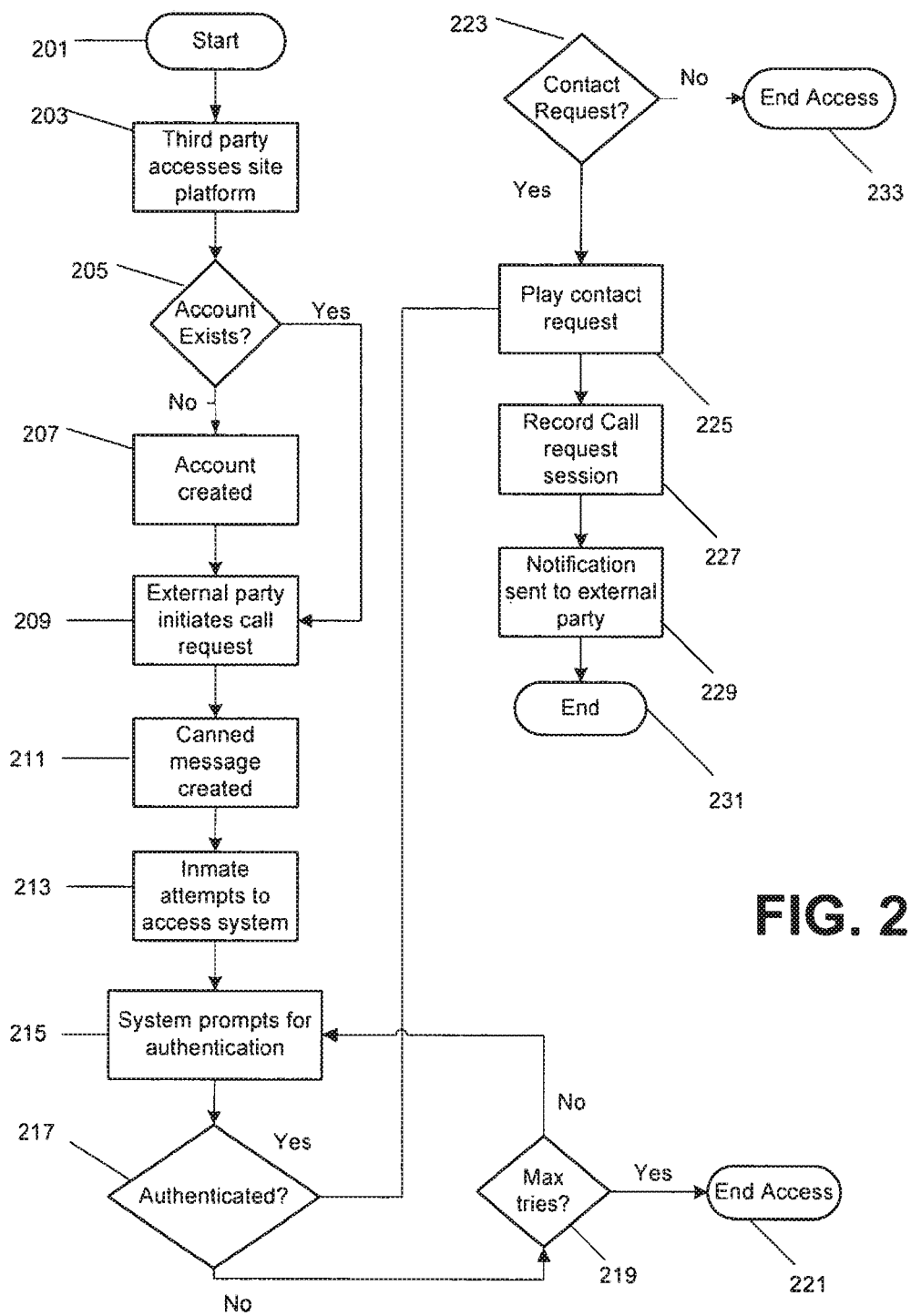
FIG. 2 is a flow chart depicting the preferred process implemented by the invention of a third party initiating a contact request for a specific inmate.

FIG. 2 depicts a flow chart illustrating the preferred method of notifying an inmate through a web initiated call request according to the invention. The method starts in step 201 and proceeds to step 203 whereby an external party (i.e., third party) accesses site platform 103 to set up a contact call request account (also called "account") that is associated with the external party telephone number. Next, in step 205, if an account exists for the telephone number, then the method proceeds to step 20.9 whereby the external party initiates a call request. The external party may access site platform 103 through a web browser and select the specific inmate to notify. The external party may select the specific canned message to send to the inmate, selecting from a list of predetermined choices. In this way, system 100 provides an inmate notification system that is easier to implement while giving the institution more control over call request message sent to the specific inmate.

However, if an account does not exist, then in step 207, the external party creates an account, in accounting system, by providing billing information associated with the third party telephone number that is to be associated with the account. The site platform 103 takes the external party through as many attempts to ensure that the account is successfully set up. In other non-limiting embodiments, accounting system may also require the external party to provide additional details verifying that the external party is a family member, etc. before creating the account. Further, by signing up for incoming web initiated contact requests, the accounting system bills the external party appropriate usage charges or may provide for a monthly billing rate. Next, in step 211, a canned message is created by site platform 103 by software, which converts the text message into a canned audio message. This audio message is stored in memory in site platform 103 to be played to the specific inmate when the inmate user next accesses system 100. Next, in step 213, the inmate user attempts to access system 100 and in step 215, system 100 prompts for user authentication through an interactive voice response system. In step 217, if the inmate user fails to be authenticated, then the system 100 denies entry. The attempt to access the system 100 is terminated in step 205 after the number of attempts to access the system 100 matches the maximum number of attempts allowed by the system 100. If the maximum number of attempts has not yet been reached, the site platform 103 again prompts the inmate user for authentication in step 215.

After the inmate user has successfully accessed the call management system 100, next in step 223, if there is a contact request available for the inmate, then the site platform 103, in step 225, plays the audio canned message to the inmate. However, if a contact request has not been created to listen by the inmate, then the system 100 ends access to system 100 in step 233.

Next, in step 223, the site platform 103 plays call request to inmate user and in step 227, call request session is stored in database by a software system, such as in one non-limiting example, an ITS system provided by site platform. Next, in step 229, the external party is then sent a notification via e-mail that the inmate has received the contact request, although in other embodiments, a notification may be sent by an SMS, an instant messenger notification, or other similar types of notification. The method ends in step 231 whereby the inmate terminates access to the call management system.

Figure 3:
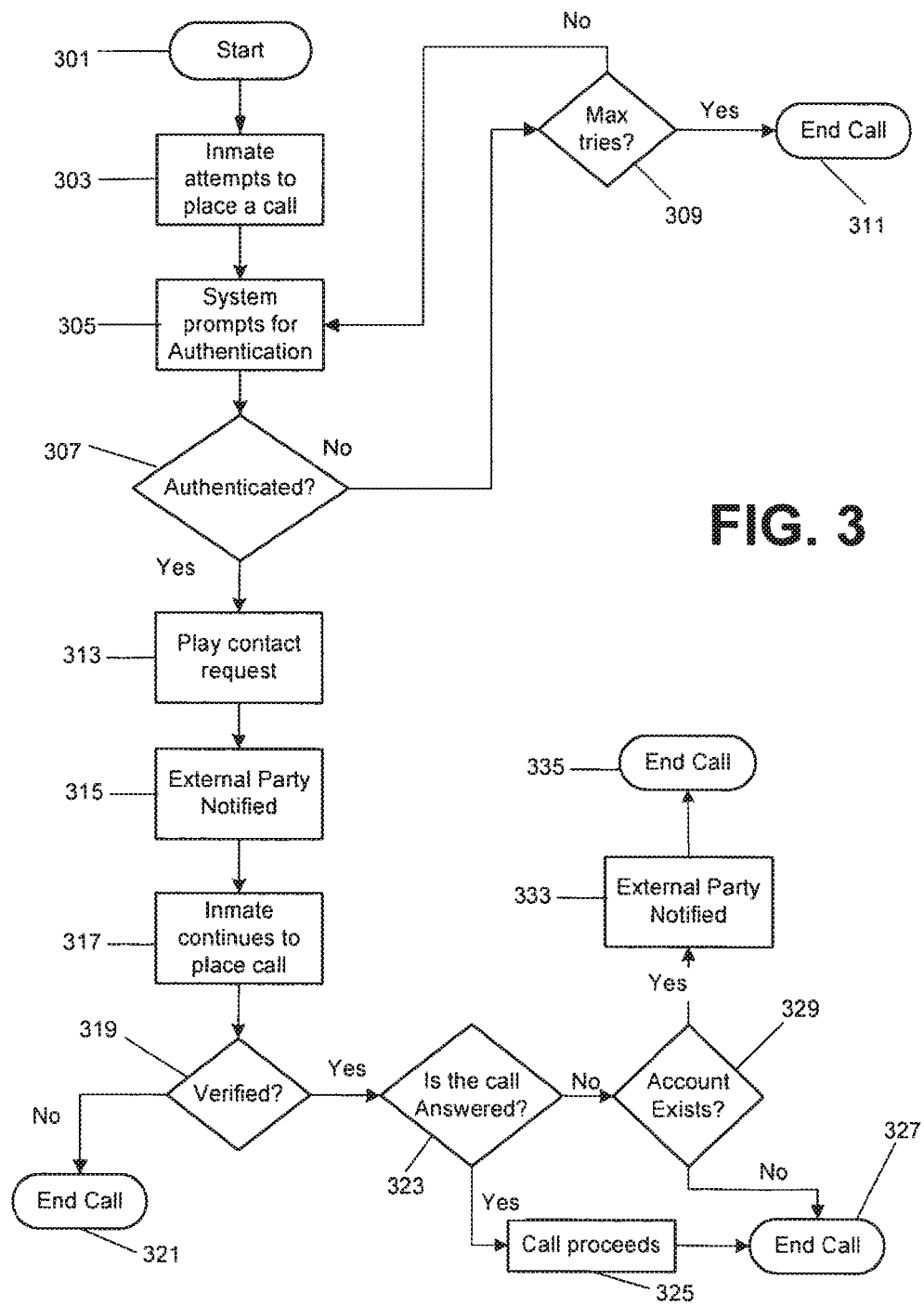
FIG. 3 is a flow chart depicting the preferred process whereby an inmate attempts to contact a third party.

FIG. 3 depicts a flow chart illustrating the preferred method of notifying an external party through an inmate telephone call request. The method starts in step 301 and proceeds to step 303 whereby an inmate user (hereinafter "user") attempts to call an external party by dialing the party's telephone number on one of a plurality of telephonic instruments 101*a*. In step 305, the site platform 103 prompts for user authentication. Authentication of the inmate is performed as is known in the art in step 307. For example, authentication may include the entering of a PIN number, using RFID technology, or utilizing biometric identification means. Such authentication may be used alone or in conjunction with any of other authentication.

Next, in step 309 system 100, through site platform 103, checks, to see whether the number of attempts to access the system 100 matches the maximum number of attempts allowed by system 100. Upon a match, the attempt to access the system 100 is terminated in step 311. If the user fails to be authenticated, then the system 100 denies entry and ends the call attempt in step 311. If the maximum number of attempts has not yet been reached, the system 100, again prompts the user for authentication as was shown in step 305.

Next, in step 313, after the inmate successfully logs in, the system 100 checks to see if there are any new contact requests from an external party and, if so, new contact requests are then played to the user. Next, in step 315, the external party who created the contact request, is sent a notification that the inmate has received the contact request via e-mail, although in other non-limiting examples, an SMS message, instant messenger message, or other similar types of notification maybe utilized. Next, in step 317, after all contact requests have been played, the inmate continues to place a call to an external party.

In step 319, verification tests are performed on the telephone number dialed such as verifying that the number dialed is an authorized number, that the number dialed has not been call forwarded, etc. If the attempted call fails the verification tests, the call attempt is ended in step 321. However, if the attempted call passes the verification tests, the call proceeds. The system attempts to make a connection—with the dialed party and detects whether the call is answered in step 323. Next, in step 329, if after a set number of rings the call remains unanswered or is answered by an answering machine, system 100, through site platform 103, determines whether the external party has signed up for outbound call notification. The call terminates in step 327 if the external party has not requested notification. However, in step 333, if the external party has requested notification that a call was missed from a specific inmate, then system 100 notifies the external party by email, although in other non-limiting examples, notification may be by SMS, instant messenger, etc. The call terminates in step 335. On the other hand, if the call is answered by a live person, then in step 325, the call proceeds with the inmate commencing a conversation with the external party. The method ends in step 327 when the conversation is voluntarily terminated by either party.

While the invention has been described with reference to the preferred embodiment and several alternative embodiments, which embodiments have been set forth in considerable detail for the purposes of making a complete disclosure of the invention, such embodiments are merely exemplary and are not intended to be limiting or represent an exhaustive enumeration of all aspects of the invention. The scope of the invention, therefore, shall be defined solely by the following claims. Further, it will be apparent to those skilled in the art that numerous changes may be made in such details without departing from the spirit and principles of the invention. It should be appreciated that the invention is capable of being embodied in other forms without departing from its essential characteristics.

What is claimed is:

1. A call management system, comprising:
one or more databases that store call restrictions associated with an inmate of a correction facility and recorded messages;
a telephone instrument associated with the inmate; and
a control platform configured to:
receive a call from an external party directed to the inmate;
determine that the inmate is unavailable;
direct the external party to leave a voice message for the inmate;
receive the voice message and a call notification flag from the external party, the call notification flag indicating whether the external party wishes to be separately notified of a missed call attempt from the inmate;
store the voice message and the call notification flag in the one or more databases;
perform security analysis on the voice message;
in response to the voice message satisfying the security analysis, notifying the inmate via the telephone instrument as to the voice message and directing the inmate to retrieve the voice message from the one or more databases;

transmitting a notification to the external party in response to the inmate retrieving the voice message from the one or more databases;
receive an outgoing call from the inmate to the external party;
detect that the outgoing call was not answered by the external party; and
transmit, in response to the detecting, a missed call notification to the external party based on the call notification flag.

2. The call management system of claim 1, wherein the security analysis includes performing speech recognition on the voice message.

3. The call management system of claim 1, wherein the one or more databases further store inmate schedules and availability.

4. The call management system of claim 3, wherein the control platform determines that the inmate is unavailable based on the inmate schedules and availability.

5. The call management system of claim 1, wherein the control platform notifies the inmate of the voice message via an SMS text message sent to the telephone instrument.

6. The call management system of claim 1, wherein the control platform is further configured to:
receive an inmate voice message from the inmate designated for the external party;
analyze the inmate voice message for content;
initiate the outgoing call to the external party in response to the inmate voice message passing the analysis of the content;
verify an identity of the external party during the outgoing call; and
play back the inmate voice message for the external party in response to the verifying.

7. A method for exchanging a message between an external party and an inmate, the method comprising:
receiving a call from the external party directed to the inmate;
determining that the inmate is unavailable;
directing the external party to leave a voice message for the inmate;
receiving the voice message and a call notification flag from the external party, the call notification flag indicating whether the external party wishes to be separately notified of a missed call attempt from the inmate;
storing the voice message and the call notification flag in a database;
performing security analysis on the voice message;
in response to the voice message satisfying the security analysis, notifying the inmate via a telephone instrument as to the voice message and directing the inmate to retrieve the voice message from the database;
transmitting a notification to the external party in response to the inmate retrieving the voice message from the database;
receiving an outgoing call from the inmate to the external party;
detecting that the outgoing call was not answered by the external party; and
transmitting, in response to the detecting, a missed call notification to the external party based on the call notification flag.

8. The method of claim 7, wherein the security analysis includes performing speech recognition on the voice message.

9. The method of claim 7, wherein the database stores schedule or availability data of the inmate.

10. The method of claim 7, further comprising:
receiving an inmate voice message from the inmate directed to the external party;
analyzing the inmate voice message for content; and
delivering the inmate voice message to the external party.

11. The method of claim 10, wherein the delivering includes:
initiating the outgoing call to the external party;
verifying an identity of the external party; and
playing back the inmate voice message for the external party.

12. The method of claim 11, wherein the verifying includes receiving a personal identification number from the external party.

13. The method of claim 11, wherein the verifying includes performing voice verification on the external party.

* * * * *